US008572423B1

(12) United States Patent
Isachar et al.

(10) Patent No.: US 8,572,423 B1
(45) Date of Patent: Oct. 29, 2013

(54) REDUCING PEAK CURRENT IN MEMORY SYSTEMS

(75) Inventors: Ori Isachar, Tel Aviv (IL); Julian Vlaiko, Kfar Saba (IL); Gil Semo, Tel Aviv (IL); Atai Levy, Ra'anana (IL)

(73) Assignee: Apple Inc., Cupertino, CA (US)

( * ) Notice: Subject to any disclaimer, the term of this patent is extended or adjusted under 35 U.S.C. 154(b) by 291 days.

(21) Appl. No.: 13/021,754

(22) Filed: Feb. 6, 2011

Related U.S. Application Data (60) Provisional application No. 61/357,114, filed on Jun. 22, 2010.

(51) Int. Cl.
*G06F 1/00* (2006.01)

(52) U.S. Cl.
USPC .......................... 713/340; 365/244

(58) Field of Classification Search
USPC .......................... 713/340; 365/244
See application file for complete search history.

(56) References Cited

U.S. PATENT DOCUMENTS

| 3,668,631 | A | 6/1972 | Griffith et al. |
| 3,668,632 | A | 6/1972 | Oldham |
| 4,058,851 | A | 11/1977 | Scheuneman |
| 4,112,502 | A | 9/1978 | Scheuneman |
| 4,394,763 | A | 7/1983 | Nagano et al. |
| 4,413,339 | A | 11/1983 | Riggle et al. |
| 4,556,961 | A | 12/1985 | Iwahashi et al. |
| 4,558,431 | A | 12/1985 | Satoh |
| 4,608,687 | A | 8/1986 | Dutton |
| 4,654,847 | A | 3/1987 | Dutton |
| 4,661,929 | A | 4/1987 | Aoki et al. |
| 4,768,171 | A | 8/1988 | Tada |
| 4,811,285 | A | 3/1989 | Walker et al. |
| 4,899,342 | A | 2/1990 | Potter et al. |
| 4,910,706 | A | 3/1990 | Hyatt |
| 4,993,029 | A | 2/1991 | Galbraith et al. |
| 5,056,089 | A | 10/1991 | Furuta et al. |
| 5,077,722 | A | 12/1991 | Geist et al. |
| 5,126,808 | A | 6/1992 | Montalvo et al. |
| 5,163,021 | A | 11/1992 | Mehrotra et al. |
| 5,172,338 | A | 12/1992 | Mehrotta et al. |
| 5,182,558 | A | 1/1993 | Mayo |

(Continued)

FOREIGN PATENT DOCUMENTS

| EP | 0783754 B1 | 7/1997 |
| EP | 1434236 B1 | 6/2004 |

(Continued)

OTHER PUBLICATIONS

U.S. Appl. No. 12/323,544 Office Action dated Dec. 13, 2011.

(Continued)

*Primary Examiner* — Hoai V Ho
(74) *Attorney, Agent, or Firm* — Meyertons, Hood, Kivlin, Kowert & Goetzel, P.C.

(57) ABSTRACT

A memory device includes a plurality of memory cells, a token input interface, a token output interface and control circuitry. The control circuitry is configured to accept a storage command, to condition execution of at least a part of the storage command on a presence of a token pulse on the token input interface, to execute the storage command, including the conditioned part, in the memory cells upon reception of the token pulse on the token input interface, and to reproduce the token pulse on the token output interface upon completion of the execution.

14 Claims, 3 Drawing Sheets

(56) References Cited

U.S. PATENT DOCUMENTS

| | | |
|---|---|---|
| 5,182,752 A | 1/1993 | DeRoo et al. |
| 5,191,584 A | 3/1993 | Anderson |
| 5,200,959 A | 4/1993 | Gross et al. |
| 5,237,535 A | 8/1993 | Mielke et al. |
| 5,272,669 A | 12/1993 | Samachisa et al. |
| 5,276,649 A | 1/1994 | Hoshita et al. |
| 5,287,469 A | 2/1994 | Tsuboi |
| 5,365,484 A | 11/1994 | Cleveland et al. |
| 5,388,064 A | 2/1995 | Khan |
| 5,416,646 A | 5/1995 | Shirai |
| 5,416,782 A | 5/1995 | Wells et al. |
| 5,446,854 A | 8/1995 | Khalidi et al. |
| 5,450,424 A | 9/1995 | Okugaki et al. |
| 5,469,444 A | 11/1995 | Endoh et al. |
| 5,473,753 A | 12/1995 | Wells et al. |
| 5,479,170 A | 12/1995 | Cauwenberghs et al. |
| 5,508,958 A | 4/1996 | Fazio et al. |
| 5,519,831 A | 5/1996 | Holzhammer |
| 5,532,962 A | 7/1996 | Auclair et al. |
| 5,533,190 A | 7/1996 | Binford et al. |
| 5,541,886 A | 7/1996 | Hasbun |
| 5,600,677 A | 2/1997 | Citta et al. |
| 5,638,320 A | 6/1997 | Wong et al. |
| 5,657,332 A | 8/1997 | Auclair et al. |
| 5,675,540 A | 10/1997 | Roohparvar |
| 5,682,352 A | 10/1997 | Wong et al. |
| 5,687,114 A | 11/1997 | Khan |
| 5,696,717 A | 12/1997 | Koh |
| 5,726,649 A | 3/1998 | Tamaru et al. |
| 5,726,934 A | 3/1998 | Tran et al. |
| 5,742,752 A | 4/1998 | De Koening |
| 5,748,533 A | 5/1998 | Dunlap et al. |
| 5,748,534 A | 5/1998 | Dunlap et al. |
| 5,751,637 A | 5/1998 | Chen et al. |
| 5,761,402 A | 6/1998 | Kaneda et al. |
| 5,798,966 A | 8/1998 | Keeney |
| 5,799,200 A | 8/1998 | Brant et al. |
| 5,801,985 A | 9/1998 | Roohparvar et al. |
| 5,838,832 A | 11/1998 | Barnsley |
| 5,860,106 A | 1/1999 | Domen et al. |
| 5,867,114 A | 2/1999 | Barbir |
| 5,867,428 A | 2/1999 | Ishii et al. |
| 5,867,429 A | 2/1999 | Chen et al. |
| 5,877,986 A | 3/1999 | Harari et al. |
| 5,889,937 A | 3/1999 | Tamagawa |
| 5,901,089 A | 5/1999 | Korsh et al. |
| 5,909,449 A | 6/1999 | So et al. |
| 5,912,906 A | 6/1999 | Wu et al. |
| 5,930,167 A | 7/1999 | Lee et al. |
| 5,937,424 A | 8/1999 | Leak et al. |
| 5,942,004 A | 8/1999 | Cappelletti |
| 5,946,716 A | 8/1999 | Karp et al. |
| 5,969,986 A | 10/1999 | Wong et al. |
| 5,982,668 A | 11/1999 | Ishii et al. |
| 5,991,517 A | 11/1999 | Harari et al. |
| 5,995,417 A | 11/1999 | Chen et al. |
| 6,009,014 A | 12/1999 | Hollmer et al. |
| 6,009,016 A | 12/1999 | Ishii et al. |
| 6,023,425 A | 2/2000 | Ishii et al. |
| 6,034,891 A | 3/2000 | Norman |
| 6,040,993 A | 3/2000 | Chen et al. |
| 6,041,430 A | 3/2000 | Yamauchi |
| 6,073,204 A | 6/2000 | Lakhani et al. |
| 6,101,614 A | 8/2000 | Gonzales et al. |
| 6,128,237 A | 10/2000 | Shirley et al. |
| 6,134,140 A | 10/2000 | Tanaka et al. |
| 6,134,143 A | 10/2000 | Norman |
| 6,134,631 A | 10/2000 | Jennings |
| 6,141,261 A | 10/2000 | Patti |
| 6,151,246 A | 11/2000 | So et al. |
| 6,157,573 A | 12/2000 | Ishii et al. |
| 6,166,962 A | 12/2000 | Chen et al. |
| 6,169,691 B1 | 1/2001 | Pasotti et al. |
| 6,178,466 B1 | 1/2001 | Gilbertson et al. |
| 6,185,134 B1 | 2/2001 | Tanaka |
| 6,209,113 B1 | 3/2001 | Roohparvar |
| 6,212,654 B1 | 4/2001 | Lou et al. |
| 6,219,276 B1 | 4/2001 | Parker |
| 6,219,447 B1 | 4/2001 | Lee et al. |
| 6,222,762 B1 | 4/2001 | Guterman et al. |
| 6,230,233 B1 | 5/2001 | Lofgren et al. |
| 6,240,458 B1 | 5/2001 | Gilbertson |
| 6,259,627 B1 | 7/2001 | Wong |
| 6,275,419 B1 | 8/2001 | Guterman et al. |
| 6,278,632 B1 | 8/2001 | Chevallier |
| 6,279,069 B1 | 8/2001 | Robinson et al. |
| 6,288,944 B1 | 9/2001 | Kawamura |
| 6,292,394 B1 | 9/2001 | Cohen et al. |
| 6,301,151 B1 | 10/2001 | Engh et al. |
| 6,304,486 B1 | 10/2001 | Yano |
| 6,307,776 B1 | 10/2001 | So et al. |
| 6,314,044 B1 | 11/2001 | Sasaki et al. |
| 6,317,363 B1 | 11/2001 | Guterman et al. |
| 6,317,364 B1 | 11/2001 | Guterman et al. |
| 6,345,004 B1 | 2/2002 | Omura et al. |
| 6,360,346 B1 | 3/2002 | Miyauchi et al. |
| 6,363,008 B1 | 3/2002 | Wong |
| 6,363,454 B1 | 3/2002 | Lakhani et al. |
| 6,366,496 B1 | 4/2002 | Torelli et al. |
| 6,385,092 B1 | 5/2002 | Ishii et al. |
| 6,392,932 B1 | 5/2002 | Ishii et al. |
| 6,396,742 B1 | 5/2002 | Korsh et al. |
| 6,397,364 B1 | 5/2002 | Barkan |
| 6,405,323 B1 | 6/2002 | Lin et al. |
| 6,405,342 B1 | 6/2002 | Lee |
| 6,418,060 B1 | 7/2002 | Yang et al. |
| 6,442,585 B1 | 8/2002 | Dean et al. |
| 6,445,602 B1 | 9/2002 | Kokudo et al. |
| 6,452,838 B1 | 9/2002 | Ishii et al. |
| 6,456,528 B1 | 9/2002 | Chen |
| 6,466,476 B1 | 10/2002 | Wong et al. |
| 6,467,062 B1 | 10/2002 | Barkan |
| 6,469,931 B1 | 10/2002 | Ban et al. |
| 6,480,948 B1 | 11/2002 | Virajpet et al. |
| 6,490,236 B1 | 12/2002 | Fukuda et al. |
| 6,522,580 B2 | 2/2003 | Chen et al. |
| 6,525,952 B2 | 2/2003 | Araki et al. |
| 6,532,556 B1 | 3/2003 | Wong et al. |
| 6,538,922 B1 | 3/2003 | Khalid et al. |
| 6,549,464 B2 | 4/2003 | Tanaka et al. |
| 6,553,510 B1 | 4/2003 | Pekny et al. |
| 6,558,967 B1 | 5/2003 | Wong |
| 6,560,152 B1 | 5/2003 | Cernea |
| 6,567,311 B2 | 5/2003 | Ishii et al. |
| 6,577,539 B2 | 6/2003 | Iwahashi |
| 6,584,012 B2 | 6/2003 | Banks |
| 6,615,307 B1 | 9/2003 | Roohparvar |
| 6,621,739 B2 | 9/2003 | Gonzalez et al. |
| 6,640,326 B1 | 10/2003 | Buckingham et al. |
| 6,643,169 B2 | 11/2003 | Rudelic et al. |
| 6,646,913 B2 | 11/2003 | Micheloni et al. |
| 6,678,192 B2 | 1/2004 | Gongwer et al. |
| 6,683,811 B2 | 1/2004 | Ishii et al. |
| 6,687,155 B2 | 2/2004 | Nagasue |
| 6,707,748 B2 | 3/2004 | Lin et al. |
| 6,708,257 B2 | 3/2004 | Bao |
| 6,714,449 B2 | 3/2004 | Khalid |
| 6,717,847 B2 | 4/2004 | Chen |
| 6,731,557 B2 | 5/2004 | Beretta |
| 6,732,250 B2 | 5/2004 | Durrant |
| 6,738,293 B1 | 5/2004 | Iwahashi |
| 6,751,766 B2 | 6/2004 | Guterman et al. |
| 6,757,193 B2 | 6/2004 | Chen et al. |
| 6,774,808 B1 | 8/2004 | Hibbs et al. |
| 6,781,877 B2 | 8/2004 | Cernea et al. |
| 6,804,805 B2 | 10/2004 | Rub |
| 6,807,095 B2 | 10/2004 | Chen et al. |
| 6,807,101 B2 | 10/2004 | Ooishi et al. |
| 6,809,964 B2 | 10/2004 | Moschopoulos et al. |
| 6,819,592 B2 | 11/2004 | Noguchi et al. |
| 6,829,167 B2 | 12/2004 | Tu et al. |
| 6,845,052 B1 | 1/2005 | Ho et al. |
| 6,851,018 B2 | 2/2005 | Wyatt et al. |
| 6,851,081 B2 | 2/2005 | Yamamoto |

(56) References Cited

U.S. PATENT DOCUMENTS

| | | |
|---|---|---|
| 6,856,546 B2 | 2/2005 | Guterman et al. |
| 6,862,218 B2 | 3/2005 | Guterman et al. |
| 6,870,767 B2 | 3/2005 | Rudelic et al. |
| 6,870,773 B2 | 3/2005 | Noguchi et al. |
| 6,873,552 B2 | 3/2005 | Ishii et al. |
| 6,879,520 B2 | 4/2005 | Hosono et al. |
| 6,882,567 B1 | 4/2005 | Wong |
| 6,894,926 B2 | 5/2005 | Guterman et al. |
| 6,907,497 B2 | 6/2005 | Hosono et al. |
| 6,925,009 B2 | 8/2005 | Noguchi et al. |
| 6,930,925 B2 | 8/2005 | Guo et al. |
| 6,934,188 B2 | 8/2005 | Roohparvar |
| 6,937,511 B2 | 8/2005 | Hsu et al. |
| 6,958,938 B2 | 10/2005 | Noguchi et al. |
| 6,963,505 B2 | 11/2005 | Cohen |
| 6,972,993 B2 | 12/2005 | Conley et al. |
| 6,988,175 B2 | 1/2006 | Lasser |
| 6,992,932 B2 | 1/2006 | Cohen |
| 6,999,344 B2 | 2/2006 | Hosono et al. |
| 7,002,843 B2 | 2/2006 | Guterman et al. |
| 7,006,379 B2 | 2/2006 | Noguchi et al. |
| 7,012,835 B2 | 3/2006 | Gonzalez et al. |
| 7,020,017 B2 | 3/2006 | Chen et al. |
| 7,023,735 B2 | 4/2006 | Ban et al. |
| 7,031,210 B2 | 4/2006 | Park et al. |
| 7,031,214 B2 | 4/2006 | Tran |
| 7,031,216 B2 | 4/2006 | You |
| 7,039,846 B2 | 5/2006 | Hewitt et al. |
| 7,042,766 B1 | 5/2006 | Wang et al. |
| 7,054,193 B1 | 5/2006 | Wong |
| 7,054,199 B2 | 5/2006 | Lee et al. |
| 7,057,958 B2 | 6/2006 | So et al. |
| 7,065,147 B2 | 6/2006 | Ophir et al. |
| 7,068,539 B2 | 6/2006 | Guterman et al. |
| 7,071,849 B2 | 7/2006 | Zhang |
| 7,072,222 B2 | 7/2006 | Ishii et al. |
| 7,079,555 B2 | 7/2006 | Baydar et al. |
| 7,088,615 B2 | 8/2006 | Guterman et al. |
| 7,099,194 B2 | 8/2006 | Tu et al. |
| 7,102,924 B2 | 9/2006 | Chen et al. |
| 7,113,432 B2 | 9/2006 | Mokhlesi |
| 7,130,210 B2 | 10/2006 | Bathul et al. |
| 7,139,192 B1 | 11/2006 | Wong |
| 7,139,198 B2 | 11/2006 | Guterman et al. |
| 7,145,805 B2 | 12/2006 | Ishii et al. |
| 7,151,692 B2 | 12/2006 | Wu |
| 7,158,058 B1 | 1/2007 | Yu |
| 7,170,781 B2 | 1/2007 | So et al. |
| 7,170,802 B2 | 1/2007 | Cernea et al. |
| 7,173,859 B2 | 2/2007 | Hemink |
| 7,177,184 B2 | 2/2007 | Chen |
| 7,177,195 B2 | 2/2007 | Gonzalez et al. |
| 7,177,199 B2 | 2/2007 | Chen et al. |
| 7,177,200 B2 | 2/2007 | Ronen et al. |
| 7,184,338 B2 | 2/2007 | Nakagawa et al. |
| 7,187,195 B2 | 3/2007 | Kim |
| 7,187,592 B2 | 3/2007 | Guterman et al. |
| 7,190,614 B2 | 3/2007 | Wu |
| 7,193,898 B2 | 3/2007 | Cernea |
| 7,193,921 B2 | 3/2007 | Choi et al. |
| 7,196,644 B1 | 3/2007 | Anderson et al. |
| 7,196,928 B2 | 3/2007 | Chen |
| 7,196,933 B2 | 3/2007 | Shibata |
| 7,197,594 B2 | 3/2007 | Raz et al. |
| 7,200,062 B2 | 4/2007 | Kinsely et al. |
| 7,210,077 B2 | 4/2007 | Brandenberger et al. |
| 7,221,592 B2 | 5/2007 | Nazarian |
| 7,224,613 B2 | 5/2007 | Chen et al. |
| 7,231,474 B1 | 6/2007 | Helms et al. |
| 7,231,562 B2 | 6/2007 | Ohlhoff et al. |
| 7,243,275 B2 | 7/2007 | Gongwer et al. |
| 7,254,690 B2 | 8/2007 | Rao |
| 7,254,763 B2 | 8/2007 | Aadsen et al. |
| 7,257,027 B2 | 8/2007 | Park |
| 7,259,987 B2 | 8/2007 | Chen et al. |
| 7,266,026 B2 | 9/2007 | Gongwer et al. |
| 7,266,069 B2 | 9/2007 | Chu |
| 7,269,066 B2 | 9/2007 | Nguyen et al. |
| 7,272,757 B2 | 9/2007 | Stocken |
| 7,274,611 B2 | 9/2007 | Roohparvar |
| 7,277,355 B2 | 10/2007 | Tanzana |
| 7,280,398 B1 | 10/2007 | Lee et al. |
| 7,280,409 B2 | 10/2007 | Misumi et al. |
| 7,280,415 B2 | 10/2007 | Hwang et al. |
| 7,283,399 B2 | 10/2007 | Ishii et al. |
| 7,289,344 B2 | 10/2007 | Chen |
| 7,301,807 B2 | 11/2007 | Khalid et al. |
| 7,301,817 B2 | 11/2007 | Li et al. |
| 7,308,525 B2 | 12/2007 | Lasser et al. |
| 7,310,255 B2 | 12/2007 | Chan |
| 7,310,269 B2 | 12/2007 | Shibata |
| 7,310,271 B2 | 12/2007 | Lee |
| 7,310,272 B1 | 12/2007 | Mokhlesi et al. |
| 7,310,347 B2 | 12/2007 | Lasser |
| 7,312,727 B1 | 12/2007 | Feng et al. |
| 7,321,509 B2 | 1/2008 | Chen et al. |
| 7,328,384 B1 | 2/2008 | Kulkarni et al. |
| 7,342,831 B2 | 3/2008 | Mokhlesi et al. |
| 7,343,330 B1 | 3/2008 | Boesjes et al. |
| 7,345,924 B2 | 3/2008 | Nguyen et al. |
| 7,345,928 B2 | 3/2008 | Li |
| 7,349,263 B2 | 3/2008 | Kim et al. |
| 7,356,755 B2 | 4/2008 | Fackenthal |
| 7,363,420 B2 | 4/2008 | Lin et al. |
| 7,365,671 B1 | 4/2008 | Anderson |
| 7,388,781 B2 | 6/2008 | Litsyn et al. |
| 7,397,697 B2 | 7/2008 | So et al. |
| 7,405,974 B2 | 7/2008 | Yaoi et al. |
| 7,405,979 B2 | 7/2008 | Ishii et al. |
| 7,408,804 B2 | 8/2008 | Hemink et al. |
| 7,408,810 B2 | 8/2008 | Aritome et al. |
| 7,409,473 B2 | 8/2008 | Conley et al. |
| 7,409,623 B2 | 8/2008 | Baker et al. |
| 7,420,847 B2 | 9/2008 | Li |
| 7,433,231 B2 | 10/2008 | Aritome |
| 7,433,697 B2 | 10/2008 | Karaoguz et al. |
| 7,434,111 B2 | 10/2008 | Sugiura et al. |
| 7,437,498 B2 | 10/2008 | Ronen |
| 7,440,324 B2 | 10/2008 | Mokhlesi |
| 7,440,331 B2 | 10/2008 | Hemink |
| 7,441,067 B2 | 10/2008 | Gorobets et al. |
| 7,447,970 B2 | 11/2008 | Wu et al. |
| 7,450,421 B2 | 11/2008 | Mokhlesi et al. |
| 7,453,737 B2 | 11/2008 | Ha |
| 7,457,163 B2 | 11/2008 | Hemink |
| 7,457,897 B1 | 11/2008 | Lee et al. |
| 7,460,410 B2 | 12/2008 | Nagai et al. |
| 7,460,412 B2 | 12/2008 | Lee et al. |
| 7,466,592 B2 | 12/2008 | Mitani et al. |
| 7,468,907 B2 | 12/2008 | Kang et al. |
| 7,468,911 B2 | 12/2008 | Lutze et al. |
| 7,469,049 B1 | 12/2008 | Feng |
| 7,471,581 B2 | 12/2008 | Tran et al. |
| 7,483,319 B2 | 1/2009 | Brown |
| 7,487,329 B2 | 2/2009 | Hepkin et al. |
| 7,487,394 B2 | 2/2009 | Forhan et al. |
| 7,492,641 B2 | 2/2009 | Hosono et al. |
| 7,508,710 B2 | 3/2009 | Mokhlesi |
| 7,526,711 B2 | 4/2009 | Orio |
| 7,539,061 B2 | 5/2009 | Lee |
| 7,539,062 B2 | 5/2009 | Doyle |
| 7,551,492 B2 | 6/2009 | Kim |
| 7,558,109 B2 | 7/2009 | Brandman et al. |
| 7,558,839 B1 | 7/2009 | McGovern |
| 7,568,135 B2 | 7/2009 | Cornwell et al. |
| 7,570,520 B2 | 8/2009 | Kamei et al. |
| 7,574,555 B2 | 8/2009 | Porat et al. |
| 7,590,002 B2 | 9/2009 | Mokhlesi et al. |
| 7,593,259 B2 | 9/2009 | Kim |
| 7,594,093 B1 | 9/2009 | Kancherla |
| 7,596,707 B1 | 9/2009 | Vemula |
| 7,609,787 B2 | 10/2009 | Jahan et al. |
| 7,613,043 B2 | 11/2009 | Cornwell et al. |
| 7,616,498 B2 | 11/2009 | Mokhlesi et al. |

(56) References Cited

U.S. PATENT DOCUMENTS

| | | |
|---|---|---|
| 7,619,918 B2 | 11/2009 | Aritome |
| 7,631,245 B2 | 12/2009 | Lasser |
| 7,633,798 B2 | 12/2009 | Sarin et al. |
| 7,633,802 B2 | 12/2009 | Mokhlesi |
| 7,639,532 B2 | 12/2009 | Roohparvar et al. |
| 7,644,347 B2 | 1/2010 | Alexander et al. |
| 7,656,734 B2 | 2/2010 | Thorp et al. |
| 7,660,158 B2 | 2/2010 | Aritome |
| 7,660,183 B2 | 2/2010 | Ware et al. |
| 7,661,000 B2 | 2/2010 | Ueda et al. |
| 7,661,054 B2 | 2/2010 | Huffman et al. |
| 7,665,007 B2 | 2/2010 | Yang et al. |
| 7,680,987 B1 | 3/2010 | Clark et al. |
| 7,733,712 B1 | 6/2010 | Walston et al. |
| 7,742,351 B2 | 6/2010 | Inoue et al. |
| 7,761,624 B2 | 7/2010 | Karamcheti et al. |
| 7,797,609 B2 | 9/2010 | Neuman |
| 7,810,017 B2 | 10/2010 | Radke |
| 7,848,149 B2 | 12/2010 | Gonzalez et al. |
| 7,869,273 B2 | 1/2011 | Lee et al. |
| 7,885,119 B2 | 2/2011 | Li |
| 7,904,783 B2 | 3/2011 | Brandman et al. |
| 7,928,497 B2 | 4/2011 | Yaegashi |
| 7,929,549 B1 | 4/2011 | Talbot |
| 7,930,515 B2 | 4/2011 | Gupta et al. |
| 7,945,825 B2 | 5/2011 | Cohen et al. |
| 7,978,516 B2 | 7/2011 | Olbrich et al. |
| 8,014,094 B1 | 9/2011 | Jin |
| 8,037,380 B2 | 10/2011 | Cagno et al. |
| 8,040,744 B2 | 10/2011 | Gorobets et al. |
| 8,065,583 B2 | 11/2011 | Radke |
| 2001/0002172 A1 | 5/2001 | Tanaka et al. |
| 2001/0006479 A1 | 7/2001 | Ikehashi et al. |
| 2002/0038440 A1 | 3/2002 | Barkan |
| 2002/0056064 A1 | 5/2002 | Kidorf et al. |
| 2002/0118574 A1 | 8/2002 | Gongwer et al. |
| 2002/0133684 A1 | 9/2002 | Anderson |
| 2002/0166091 A1 | 11/2002 | Kidorf et al. |
| 2002/0174295 A1 | 11/2002 | Ulrich et al. |
| 2002/0196510 A1 | 12/2002 | Hietala et al. |
| 2003/0002348 A1 | 1/2003 | Chen et al. |
| 2003/0103400 A1 | 6/2003 | Van Tran |
| 2003/0161183 A1 | 8/2003 | Tran |
| 2003/0189856 A1 | 10/2003 | Cho et al. |
| 2004/0057265 A1 | 3/2004 | Mirabel et al. |
| 2004/0057285 A1 | 3/2004 | Cernea et al. |
| 2004/0083333 A1 | 4/2004 | Chang et al. |
| 2004/0083334 A1 | 4/2004 | Chang et al. |
| 2004/0105311 A1 | 6/2004 | Cernea et al. |
| 2004/0114437 A1 | 6/2004 | Li |
| 2004/0160842 A1 | 8/2004 | Fukiage |
| 2004/0223371 A1 | 11/2004 | Roohparvar |
| 2005/0007802 A1 | 1/2005 | Gerpheide |
| 2005/0013165 A1 | 1/2005 | Ban |
| 2005/0024941 A1 | 2/2005 | Lasser et al. |
| 2005/0024978 A1 | 2/2005 | Ronen |
| 2005/0030788 A1 | 2/2005 | Parkinson et al. |
| 2005/0086574 A1 | 4/2005 | Fackenthal |
| 2005/0121436 A1 | 6/2005 | Kamitani et al. |
| 2005/0144361 A1 | 6/2005 | Gonzalez et al. |
| 2005/0157555 A1 | 7/2005 | Ono et al. |
| 2005/0162913 A1 | 7/2005 | Chen |
| 2005/0169051 A1 | 8/2005 | Khalid et al. |
| 2005/0189649 A1 | 9/2005 | Maruyama et al. |
| 2005/0213393 A1 | 9/2005 | Lasser |
| 2005/0224853 A1 | 10/2005 | Ohkawa |
| 2005/0240745 A1 | 10/2005 | Iyer et al. |
| 2005/0243626 A1 | 11/2005 | Ronen |
| 2006/0004952 A1 | 1/2006 | Lasser |
| 2006/0028875 A1 | 2/2006 | Avraham et al. |
| 2006/0028877 A1 | 2/2006 | Meir |
| 2006/0101193 A1 | 5/2006 | Murin |
| 2006/0106972 A1 | 5/2006 | Gorobets et al. |
| 2006/0107136 A1 | 5/2006 | Gongwer et al. |
| 2006/0129750 A1 | 6/2006 | Lee et al. |
| 2006/0133141 A1 | 6/2006 | Gorobets |
| 2006/0156189 A1 | 7/2006 | Tomlin |
| 2006/0179334 A1 | 8/2006 | Brittain et al. |
| 2006/0190699 A1 | 8/2006 | Lee |
| 2006/0203546 A1 | 9/2006 | Lasser |
| 2006/0218359 A1 | 9/2006 | Sanders et al. |
| 2006/0221692 A1 | 10/2006 | Chen |
| 2006/0221705 A1 | 10/2006 | Hemink et al. |
| 2006/0221714 A1 | 10/2006 | Li et al. |
| 2006/0239077 A1 | 10/2006 | Park et al. |
| 2006/0239081 A1 | 10/2006 | Roohparvar |
| 2006/0256620 A1 | 11/2006 | Nguyen et al. |
| 2006/0256626 A1 | 11/2006 | Werner et al. |
| 2006/0256891 A1 | 11/2006 | Yuan et al. |
| 2006/0271748 A1 | 11/2006 | Jain et al. |
| 2006/0285392 A1 | 12/2006 | Incarnati et al. |
| 2006/0285396 A1 | 12/2006 | Ha |
| 2007/0006013 A1 | 1/2007 | Moshayedi et al. |
| 2007/0019481 A1 | 1/2007 | Park |
| 2007/0033581 A1 | 2/2007 | Tomlin et al. |
| 2007/0047314 A1 | 3/2007 | Goda et al. |
| 2007/0047326 A1 | 3/2007 | Nguyen et al. |
| 2007/0050536 A1 | 3/2007 | Kolokowsky |
| 2007/0058446 A1 | 3/2007 | Hwang et al. |
| 2007/0061502 A1 | 3/2007 | Lasser et al. |
| 2007/0067667 A1 | 3/2007 | Ikeuchi et al. |
| 2007/0074093 A1 | 3/2007 | Lasser |
| 2007/0086239 A1 | 4/2007 | Litsyn et al. |
| 2007/0086260 A1 | 4/2007 | Sinclair |
| 2007/0089034 A1 | 4/2007 | Litsyn et al. |
| 2007/0091677 A1 | 4/2007 | Lasser et al. |
| 2007/0091694 A1 | 4/2007 | Lee et al. |
| 2007/0103978 A1 | 5/2007 | Conley et al. |
| 2007/0103986 A1 | 5/2007 | Chen |
| 2007/0104211 A1 | 5/2007 | Opsasnick |
| 2007/0109845 A1 | 5/2007 | Chen |
| 2007/0109849 A1 | 5/2007 | Chen |
| 2007/0115726 A1 | 5/2007 | Cohen et al. |
| 2007/0118713 A1 | 5/2007 | Guterman et al. |
| 2007/0143378 A1 | 6/2007 | Gorobets |
| 2007/0143531 A1 | 6/2007 | Atri |
| 2007/0159889 A1 | 7/2007 | Kang et al. |
| 2007/0159892 A1 | 7/2007 | Kang et al. |
| 2007/0159907 A1 | 7/2007 | Kwak |
| 2007/0168837 A1 | 7/2007 | Murin |
| 2007/0171714 A1 | 7/2007 | Wu et al. |
| 2007/0183210 A1 | 8/2007 | Choi et al. |
| 2007/0189073 A1 | 8/2007 | Aritome |
| 2007/0195602 A1 | 8/2007 | Fong et al. |
| 2007/0206426 A1 | 9/2007 | Mokhlesi |
| 2007/0208904 A1 | 9/2007 | Hsieh et al. |
| 2007/0226599 A1 | 9/2007 | Motwani |
| 2007/0236990 A1 | 10/2007 | Aritome |
| 2007/0253249 A1 | 11/2007 | Kang et al. |
| 2007/0256620 A1 | 11/2007 | Viggiano et al. |
| 2007/0263455 A1 | 11/2007 | Cornwell et al. |
| 2007/0266232 A1 | 11/2007 | Rodgers et al. |
| 2007/0271424 A1 | 11/2007 | Lee et al. |
| 2007/0280000 A1 | 12/2007 | Fujiu et al. |
| 2007/0291571 A1 | 12/2007 | Balasundaram |
| 2007/0297234 A1 | 12/2007 | Cernea et al. |
| 2008/0010395 A1 | 1/2008 | Mylly et al. |
| 2008/0025121 A1 | 1/2008 | Tanzawa |
| 2008/0043535 A1 | 2/2008 | Roohparvar |
| 2008/0049504 A1 | 2/2008 | Kasahara et al. |
| 2008/0049506 A1 | 2/2008 | Guterman |
| 2008/0052446 A1 | 2/2008 | Lasser et al. |
| 2008/0055993 A1 | 3/2008 | Lee |
| 2008/0080243 A1 | 4/2008 | Edahiro et al. |
| 2008/0082730 A1 | 4/2008 | Kim et al. |
| 2008/0089123 A1 | 4/2008 | Chae et al. |
| 2008/0104309 A1 | 5/2008 | Cheon et al. |
| 2008/0104312 A1 | 5/2008 | Lasser |
| 2008/0109590 A1 | 5/2008 | Jung et al. |
| 2008/0115017 A1 | 5/2008 | Jacobson |
| 2008/0123420 A1 | 5/2008 | Brandman et al. |
| 2008/0123426 A1 | 5/2008 | Lutze et al. |
| 2008/0126686 A1 | 5/2008 | Sokolov et al. |
| 2008/0130341 A1 | 6/2008 | Shalvi et al. |

(56) References Cited

U.S. PATENT DOCUMENTS

| | | |
|---|---|---|
| 2008/0148115 A1 | 6/2008 | Sokolov et al. |
| 2008/0151618 A1 | 6/2008 | Sharon et al. |
| 2008/0151667 A1 | 6/2008 | Miu et al. |
| 2008/0158958 A1 | 7/2008 | Sokolov et al. |
| 2008/0181001 A1 | 7/2008 | Shalvi |
| 2008/0198650 A1 | 8/2008 | Shalvi et al. |
| 2008/0198654 A1 | 8/2008 | Toda |
| 2008/0209116 A1 | 8/2008 | Caulkins |
| 2008/0209304 A1 | 8/2008 | Winarski et al. |
| 2008/0215798 A1 | 9/2008 | Sharon et al. |
| 2008/0219050 A1 | 9/2008 | Shalvi et al. |
| 2008/0239093 A1 | 10/2008 | Easwar et al. |
| 2008/0239812 A1 | 10/2008 | Abiko et al. |
| 2008/0253188 A1 | 10/2008 | Aritome |
| 2008/0263262 A1 | 10/2008 | Sokolov et al. |
| 2008/0263676 A1 | 10/2008 | Mo et al. |
| 2008/0270730 A1 | 10/2008 | Lasser et al. |
| 2008/0282106 A1 | 11/2008 | Shalvi et al. |
| 2008/0288714 A1 | 11/2008 | Salomon et al. |
| 2009/0013233 A1 | 1/2009 | Radke |
| 2009/0024905 A1 | 1/2009 | Shalvi et al. |
| 2009/0034337 A1 | 2/2009 | Aritome |
| 2009/0043831 A1 | 2/2009 | Antonopoulos et al. |
| 2009/0043951 A1 | 2/2009 | Shalvi et al. |
| 2009/0049234 A1 | 2/2009 | Oh et al. |
| 2009/0073762 A1 | 3/2009 | Lee et al. |
| 2009/0086542 A1 | 4/2009 | Lee et al. |
| 2009/0089484 A1 | 4/2009 | Chu |
| 2009/0091979 A1 | 4/2009 | Shalvi |
| 2009/0094930 A1 | 4/2009 | Schwoerer |
| 2009/0106485 A1 | 4/2009 | Anholt |
| 2009/0112949 A1 | 4/2009 | Ergan et al. |
| 2009/0132755 A1 | 5/2009 | Radke |
| 2009/0144600 A1 | 6/2009 | Perlmutter et al. |
| 2009/0150894 A1 | 6/2009 | Huang et al. |
| 2009/0157950 A1 | 6/2009 | Selinger |
| 2009/0157964 A1 | 6/2009 | Kasorla et al. |
| 2009/0158126 A1 | 6/2009 | Perlmutter et al. |
| 2009/0168524 A1 | 7/2009 | Golov et al. |
| 2009/0172257 A1 | 7/2009 | Prins et al. |
| 2009/0172261 A1 | 7/2009 | Prins et al. |
| 2009/0193184 A1 | 7/2009 | Yu et al. |
| 2009/0199074 A1 | 8/2009 | Sommer et al. |
| 2009/0204824 A1 | 8/2009 | Lin et al. |
| 2009/0204872 A1 | 8/2009 | Yu et al. |
| 2009/0213653 A1 | 8/2009 | Perlmutter et al. |
| 2009/0213654 A1 | 8/2009 | Perlmutter et al. |
| 2009/0225595 A1 | 9/2009 | Kim |
| 2009/0228761 A1 | 9/2009 | Perlmutter et al. |
| 2009/0240872 A1 | 9/2009 | Perlmutter et al. |
| 2009/0265509 A1 | 10/2009 | Klein |
| 2009/0300227 A1 | 12/2009 | Nochimowski et al. |
| 2009/0323412 A1 | 12/2009 | Mokhlesi et al. |
| 2009/0327608 A1 | 12/2009 | Eschmann et al. |
| 2010/0017650 A1 | 1/2010 | Chin et al. |
| 2010/0034022 A1 | 2/2010 | Dutta et al. |
| 2010/0057976 A1 | 3/2010 | Lasser |
| 2010/0061151 A1 | 3/2010 | Miwa et al. |
| 2010/0082883 A1 | 4/2010 | Chen et al. |
| 2010/0083247 A1 | 4/2010 | Kanevsky et al. |
| 2010/0110580 A1 | 5/2010 | Takashima |
| 2010/0124088 A1 | 5/2010 | Shalvi et al. |
| 2010/0131697 A1 | 5/2010 | Alrod et al. |
| 2010/0131827 A1 | 5/2010 | Sokolov et al. |
| 2010/0142268 A1 | 6/2010 | Aritome |
| 2010/0142277 A1 | 6/2010 | Yang et al. |
| 2010/0157675 A1 | 6/2010 | Shalvi et al. |
| 2010/0165689 A1 | 7/2010 | Rotbard et al. |
| 2010/0169547 A1 | 7/2010 | Ou |
| 2010/0169743 A1 | 7/2010 | Vogan et al. |
| 2010/0174847 A1 | 7/2010 | Paley et al. |
| 2010/0195390 A1 | 8/2010 | Shalvi |
| 2010/0199150 A1 | 8/2010 | Shalvi et al. |
| 2010/0211803 A1 | 8/2010 | Lablans |
| 2010/0220509 A1 | 9/2010 | Sokolov et al. |
| 2010/0220510 A1 | 9/2010 | Shalvi |
| 2010/0250836 A1 | 9/2010 | Sokolov et al. |
| 2010/0275050 A1* | 10/2010 | Hong .................... 713/324 |
| 2010/0287217 A1 | 11/2010 | Borchers et al. |
| 2011/0010489 A1 | 1/2011 | Yeh |
| 2011/0060969 A1 | 3/2011 | Ramamoorthy et al. |
| 2011/0066793 A1 | 3/2011 | Burd |
| 2011/0075482 A1 | 3/2011 | Shepard et al. |
| 2011/0107049 A1 | 5/2011 | Kwon et al. |
| 2011/0149657 A1 | 6/2011 | Haratsch et al. |
| 2011/0199823 A1 | 8/2011 | Bar-Or et al. |
| 2011/0302354 A1 | 12/2011 | Miller |

FOREIGN PATENT DOCUMENTS

| | | |
|---|---|---|
| EP | 1605509 A1 | 12/2005 |
| WO | 9610256 A1 | 4/1996 |
| WO | 9828745 A1 | 7/1998 |
| WO | 02100112 A1 | 12/2002 |
| WO | 03100791 A1 | 12/2003 |
| WO | 2007046084 A2 | 4/2007 |
| WO | 2007132452 A2 | 11/2007 |
| WO | 2007132453 A2 | 11/2007 |
| WO | 2007132456 A2 | 11/2007 |
| WO | 2007132457 A2 | 11/2007 |
| WO | 2007132458 A2 | 11/2007 |
| WO | 2007146010 A2 | 12/2007 |
| WO | 2008026203 A2 | 3/2008 |
| WO | 2008053472 A2 | 5/2008 |
| WO | 2008053473 A2 | 5/2008 |
| WO | 2008068747 A2 | 6/2008 |
| WO | 2008077284 A1 | 7/2008 |
| WO | 2008083131 A2 | 7/2008 |
| WO | 2008099958 A1 | 8/2008 |
| WO | 2008111058 A2 | 9/2008 |
| WO | 2008124760 A2 | 10/2008 |
| WO | 2008139441 A2 | 11/2008 |
| WO | 2009037691 A2 | 3/2009 |
| WO | 2009037697 A2 | 3/2009 |
| WO | 2009038961 A2 | 3/2009 |
| WO | 2009050703 A2 | 4/2009 |
| WO | 2009053961 A2 | 4/2009 |
| WO | 2009053962 A2 | 4/2009 |
| WO | 2009053963 A2 | 4/2009 |
| WO | 2009063450 A2 | 5/2009 |
| WO | 2009072100 A2 | 6/2009 |
| WO | 2009072101 A2 | 6/2009 |
| WO | 2009072102 A2 | 6/2009 |
| WO | 2009072103 A2 | 6/2009 |
| WO | 2009072104 A2 | 6/2009 |
| WO | 2009072105 A2 | 6/2009 |
| WO | 2009074978 A2 | 6/2009 |
| WO | 2009074979 A2 | 6/2009 |
| WO | 2009078006 A2 | 6/2009 |
| WO | 2009095902 A2 | 8/2009 |
| WO | 2011024015 A1 | 3/2011 |

OTHER PUBLICATIONS

U.S. Appl. No. 12/332,368 Office Action dated Nov. 10, 2011.
U.S. Appl. No. 12/063,544 Office Action dated Dec. 14, 2011.
U.S. Appl. No. 12/186,867 Office Action dated Jan. 17, 2012.
U.S. Appl. No. 12/119,069 Office Action dated Nov. 14, 2011.
U.S. Appl. No. 12/037,487 Office Action dated Jan. 3, 2012.
U.S. Appl. No. 11/995,812 Office Action dated Oct. 28, 2011.
U.S. Appl. No. 12/551,567 Office Action dated Oct. 27, 2011.
U.S. Appl. No. 12/618,732 Office Action dated Nov. 4, 2011.
U.S. Appl. No. 12/649,382 Office Action dated Jan. 6, 2012.
U.S. Appl. No. 13/284,909, filed Oct. 30, 2011.
U.S. Appl. No. 13/284,913, filed Oct. 30, 2011.
U.S. Appl. No. 13/338,335, filed Dec. 28, 2011.
U.S. Appl. No. 13/355,536, filed Jan. 22, 2012.
Kim et al., "Multi-bit Error Tolerant Caches Using Two-Dimensional Error Coding", Proceedings of the 40th Annual ACM/IEEE International Symposium on Microarchitecture (MICRO-40), Chicago, USA, Dec. 1-5, 2007.
Agrell et al., "Closest Point Search in Lattices", IEEE Transactions on Information Theory, vol. 48, No. 8, pp. 2201-2214, Aug. 2002.

(56) References Cited

OTHER PUBLICATIONS

Bez et al., "Introduction to Flash memory", Proceedings of the IEEE, vol. 91, No. 4, pp. 489-502, Apr. 2003.
Blahut, R.E., "Theory and Practice of Error Control Codes," Addison-Wesley, May 1984, section 3.2, pp. 47-48.
Chang, L., "Hybrid Solid State Disks: Combining Heterogeneous NAND Flash in Large SSDs", ASPDAC, Jan. 2008.
Cho et al., "Multi-Level NAND Flash Memory with Non-Uniform Threshold Voltage Distribution," IEEE International Solid-State Circuits Conference (ISSCC), San Francisco, CA, Feb. 5-7, 2001, pp. 28-29 and 424.
Compaq et al., "Universal Serial Bus Specification", revision 2.0, Apr. 27, 2000.
Databahn™, "Flash memory controller IP", Denali Software, Inc., 1994 https://www.denali.com/en/products/databahn_flash.jsp.
Datalight, Inc., "FlashFX Pro 3.1 High Performance Flash Manager for Rapid Development of Reliable Products", Nov. 16, 2006.
Duann, N., Silicon Motion Presentation "SLC & MLC Hybrid", Flash Memory Summit, Santa Clara, USA, Aug. 2008.
Eitan et al., "Can NROM, A 2-bit, Trapping Storage NVM Cell, Give a Real Challenge to Floating Gate Cells?", Proceedings of the 1999 International Conference on Solid State Devices and Materials (SSDM), pp. 522-524, Tokyo, Japan 1999.
Eitan et al., "Multilevel Flash Cells and their Trade-Offs", Proceedings of the 1996 IEEE International Electron Devices Meeting (IEDM), pp. 169-172, New York, USA 1996.
Engh et al., "A self adaptive programming method with 5 mV accuracy for multi-level storage in FLASH", pp. 115-118, Proceedings of the IEEE 2002 Custom Integrated Circuits Conference, May 12-15, 2002.
Engineering Windows 7, "Support and Q&A for Solid-State Drives", e7blog, May 5, 2009.
Goodman et al., "On-Chip ECC for Multi-Level Random Access Memories," Proceedings of the IEEE/CAM Information Theory Workshop, Ithaca, USA, Jun. 25-29, 1989.
Gotou, H., "An Experimental Confirmation of Automatic Threshold Voltage Convergence in a Flash Memory Using Alternating Word-Line Voltage Pulses", IEEE Electron Device Letters, vol. 18, No. 10, pp. 503-505, Oct. 1997.
Han et al., "An Intelligent Garbage Collection Algorithm for Flash Memory Storages", Computational Science and Its Applications—ICCSA 2006, vol. 3980/2006, pp. 1019-1027, Springer Berlin / Heidelberg, Germany, May 11, 2006.
Han et al., "CATA: A Garbage Collection Scheme for Flash Memory File Systems", Ubiquitous Intelligence and Computing, vol. 4159/2006, pp. 103-112, Springer Berlin / Heidelberg, Aug. 25, 2006.
Hong et al., "NAND Flash-based Disk Cache Using SLC/MLC Combined Flash Memory", 2010 International Workshop on Storage Network Architecture and Parallel I/Os, pp. 21-30, USA, May 3, 2010.
Horstein, "On the Design of Signals for Sequential and Nonsequential Detection Systems with Feedback," IEEE Transactions on Information Theory IT-12:4 (Oct. 1966), pp. 448-455.
How to Resolve Bad Super Block: Magic Number Wrong "in BSD", Free Online Articles Director Article Base, posted Sep. 5, 2009.
Huffman, A., "Non-Volatile Memory Host Controller Interface (NVMHCI)", Specification 1.0, Apr. 14, 2008.
JEDEC Standard JESD84-C44, "Embedded MultiMediaCard (eMMC) Mechanical Standard, with Optional Reset Signal", Jedec Solid State Technology Association, USA, Jul. 2009.
JEDEC, "UFS Specification", version 0.1, Nov. 11, 2009.
Jung et al., In "A 117 mm.sup.2 3.3V Only 128 Mb Multilevel NAND Flash Memory for Mass Storage Applications," IEEE Journal of Solid State Circuits, (11:31), Nov. 1996, pp. 1575-1583.
Kang et al., "A Superblock-based Flash Translation Layer for NAND Flash Memory", Proceedings of the 6th ACM & IEEE International Conference on Embedded Software, pp. 161-170, Seoul, Korea, Oct. 22-26, 2006.
Kawaguchi et al. 1995. A flash-memory based file system. In Proceedings of the USENIX 1995 Technical Conference, New Orleans, Louisiana. 155-164.

Kim et al., "Future Memory Technology including Emerging New Memories", Proceedings of the 24th International Conference on Microelectronics (MIEL), vol. 1, pp. 377-384, Nis, Serbia and Montenegro, May 16-19, 2004.
Lee et al., "Effects of Floating Gate Interference on NAND Flash Memory Cell Operation", IEEE Electron Device Letters, vol. 23, No. 5, pp. 264-266, May 2002.
Maayan et al., "A 512 Mb NROM Flash Data Storage Memory with 8 MB/s Data Rate", Proceedings of the 2002 IEEE International Solid-State circuits Conference (ISSCC 2002), pp. 100-101, San Francisco, USA, Feb. 3-7, 2002.
Mielke et al., "Recovery Effects in the Distributed Cycling of Flash Memories", IEEE 44th Annual International Reliability Physics Symposium, pp. 29-35, San Jose, USA, Mar. 2006.
Micron Technology Inc., "Memory Management in NAND Flash Arrays", Technical Note, year 2005.
Numonyx, "M25PE16: 16-Mbit, page-erasable serial flash memory with byte-alterability, 75 MHz SPI bus, standard pinout", Apr. 2008
Onfi, "Open NAND Flash Interface Specification," revision 1.0, Dec. 28, 2006.
Panchbhai et al., "Improving Reliability of NAND Based Flash Memory Using Hybrid SLC/MLC Device", Project Proposal for CSci 8980—Advanced Storage Systems, University of Minnesota, USA, Spring 2009.
Park et al., "Sub-Grouped Superblock Management for High-Performance Flash Storages", IEICE Electronics Express, vol. 6, No. 6, pp. 297-303, Mar. 25, 2009.
Phison Electronics Corporation, "PS8000 Controller Specification (for SD Card)", revision 1.2 Document No. S-07018, Mar. 28, 2007.
Shalvi, et al., "Signal Codes," Proceedings of the 2003 IEEE Information Theory Workshop (ITW'2003), Paris, France, Mar. 31-Apr. 4, 2003.
SD Group and SD Card Association, "SD Specifications Part 1 Physical Layer Specification", version 3.01, draft 1.00, Nov. 9, 2009.
Serial ATA International Organization, "Serial ATA Revision 3.0 Specification", Jun. 2, 2009.
Shiozaki, A., "Adaptive Type-II Hybrid Broadcast ARQ System", IEEE Transactions on Communications, vol. 44, Issue 4, pp. 420-422, Apr. 1996.
Suh et al., "A 3.3V 32Mb NAND Flash Memory with Incremental Step Pulse Programming Scheme", IEEE Journal of Solid-State Circuits, vol. 30, No. 11, pp. 1149-1156, Nov. 1995.
ST Microelectronics, "Bad Block Management in NAND Flash Memories", Application note AN-1819, Geneva, Switzerland, May 2004.
ST Microelectronics, "Wear Leveling in Single Level Cell NAND Flash Memories," Application note AN-1822 Geneva, Switzerland, Feb. 2007.
Super User Forums, "SD Card Failure, can't read superblock", posted Aug. 8, 2010.
Takeuchi et al., "A Double Level $V_{th}$ Select Gate Array Architecture for Multi-Level NAND Flash Memories", Digest of Technical Papers, 1995 Symposium on VLSI Circuits, pp. 69-70, Jun. 8-10, 1995.
Takeuchi et al., "A Multipage Cell Architecture for High-Speed Programming Multilevel NAND Flash Memories", IEEE Journal of Solid State Circuits, vol. 33, No. 8, Aug. 1998.
Ubuntu Forums, "Memory Stick Failed IO Superblock", posted Nov. 11, 2009.
Wu et al., "eNVy: A non-Volatile, Main Memory Storage System", Proceedings of the 6th International Conference on Architectural support for programming languages and operating systems, pp. 86-87, San Jose, USA, 1994.
International Application PCT/IL2007/000575 Patentability report dated Mar. 26, 2009.
International Application PCT/IL2007/000575 Search Report dated May 30, 2008.
International Application PCT/IL2007/000576 Patentability Report dated Mar. 19, 2009.
International Application PCT/IL2007/000576 Search Report dated Jul. 7, 2008.
International Application PCT/IL2007/000579 Patentability report dated Mar. 10, 2009.

(56) References Cited

OTHER PUBLICATIONS

International Application PCT/IL2007/000579 Search report dated Jul. 3, 2008.
International Application PCT/IL2007/000580 Patentability Report dated Mar. 10, 2009.
International Application PCT/IL2007/000580 Search Report dated Sep. 11, 2008.
International Application PCT/IL2007/000581 Patentability Report dated Mar. 26, 2009.
International Application PCT/IL2007/000581 Search Report dated Aug. 25, 2008.
International Application PCT/IL2007/001059 Patentability report dated Apr. 19, 2009.
International Application PCT/IL2007/001059 Search report dated Aug. 7, 2008.
International Application PCT/IL2007/001315 search report dated Aug 7, 2008.
International Application PCT/IL2007/001315 Patentability Report dated May 5, 2009.
International Application PCT/IL2007/001316 Search report dated Jul 22, 2008.
International Application PCT/IL2007/001316 Patentability Report dated May 5, 2009.
International Application PCT/IL2007/001488 Search report dated Jun. 20, 2008.
International Application PCT/IL2008/000329 Search report dated Nov. 25, 2008.
International Application PCT/IL2008/000519 Search report dated Nov. 20, 2008.
International Application PCT/IL2008/001188 Search Report dated Jan. 28, 2009.
International Application PCT/IL2008/001356 Search Report dated Feb. 3, 2009.
International Application PCT/IL2008/001446 Search report dated Feb. 20, 2009.
U.S. Appl. No. 11/949,135 Official Action dated Oct. 2, 2009.
U.S. Appl. No. 12/019,011 Official Action dated Nov. 20, 2009.
U.S. Appl. No. 11/957,970 Official Action dated May 20, 2010.
U.S. Appl. No. 12/171,797 Official Action dated Aug. 25, 2010.
U.S. Appl. No. 11/945,575 Official Action dated Aug. 24, 2010.
U.S. Appl. No. 12/497,707 Official Action dated Sep. 15, 2010.
U.S. Appl. No. 11/995,801 Official Action dated Oct. 15, 2010.
U.S. Appl. No. 12/045,520 Official Action dated Nov. 16, 2010.
U.S. Appl. No. 12/388,528 Official Action dated Nov. 29, 2010.
U.S. Appl. No. 11/995,814 Official Action dated Dec. 17, 2010.
U.S. Appl. No. 12/251,471 Official Action dated Jan. 3, 2011.
U.S. Appl. No. 12/171,797, filed Jul. 11, 2008.
U.S. Appl. No. 12/251,471, filed Oct. 15, 2008.
U.S. Appl. No. 12/497,707, filed Jul. 6, 2009.
U.S. Appl. No. 12/534,893, filed Aug. 4, 2009.
U.S. Appl. No. 12/534,898, filed Aug. 4, 2009.
U.S. Appl. No. 12/551,583, filed Sep. 1, 2009.
U.S. Appl. No. 12/551,567, filed Sep. 1, 2009.
U.S. Appl. No. 12/558,528, filed Sep. 13, 2009.
U.S. Appl. No. 12/579,430, filed Oct. 15, 2009.
U.S. Appl. No. 12/579,432, filed Oct. 15, 2009.
U.S. Appl. No. 12/607,078, filed Oct. 28, 2009.
U.S. Appl. No. 12/607,085, filed Oct. 28, 2009.
U.S. Appl. No. 12/649,358, filed Dec. 30, 2009.
U.S. Appl. No. 12/649,360, filed Dec. 30, 2009.
U.S. Appl. No. 12/688,883, filed Jan. 17, 2010.
U.S. Appl. No. 12/728,296, filed Mar. 22, 2010.
U.S. Appl. No. 12/758,003, filed Apr. 11, 2010.
U.S. Appl. No. 12/880,101, filed Sep. 12, 2010.
U.S. Appl. No. 12/890,724, filed Sep. 27, 2010.
U.S. Appl. No. 12/822,207, filed Jun. 24, 2010.
U.S. Appl. No. 12/987,174, filed Jan. 10, 2011.
U.S. Appl. No. 12/987,175, filed Jan. 10, 2011.
U.S. Appl. No. 12/963,649, filed Dec. 9, 2010.
U.S. Appl. No. 12/323,544 Official Action dated Mar. 9, 2012.
Chinese Patent Application No. 200780026181.3 Official Action dated Mar. 7, 2012.
Chinese Patent Application No. 200780026094.8 Official Action dated Feb. 2, 2012.
U.S. Appl. No. 12/332,370 Official Action dated Mar. 8, 2012.
U.S. Appl. No. 12/579,432 Official Action dated Feb. 29, 2012.
U.S. Appl. No. 12/522,175 Official Action dated Mar. 27, 2012.
U.S. Appl. No. 12/607,085 Official Action dated Mar. 28, 2012.
Budilovsky et al., "Prototyping a High-Performance Low-Cost Solid-State Disk", SYSTOR—The 4th Annual International Systems and Storage Conference, Haifa, Israel, May 30-Jun. 1, 2011.
NVM Express Protocol, "NVM Express", Revision 1.0b, Jul. 12, 2011.
SCSI Protocol, "Information Technology—SCSI Architecture Model—5 (SAM-5)", INCITS document T10/2104-D, revision 01, Jan. 28, 2009.
SAS Protocol, "Information Technology—Serial Attached SCSI—2 (SAS-2)", INCITS document T10/1760-D, revision 15a, Feb. 22, 2009.
U.S. Appl. No. 12/534,898 Official Action dated Mar. 23, 2011.
U.S. Appl. No. 13/047,822, filed Mar. 15, 2011.
U.S. Appl. No. 13/069,406, filed Mar. 23, 2011.
U.S. Appl. No. 13/088,361, filed Apr. 17, 2011.
Ankolekar et al., "Multibit Error-Correction Methods for Latency-Constrained Flash Memory Systems", IEEE Transactions on Device and Materials Reliability, vol. 10, No. 1, pp. 33-39, Mar. 2010.
U.S. Appl. No. 12/344,233 Official Action dated Jun. 24, 2011.
U.S. Appl. No. 11/995,813 Official Action dated Jun. 16, 2011.
Berman et al., "Mitigating Inter-Cell Coupling Effects in MLC NAND Flash via Constrained Coding", Flash Memory Summit, Santa Clara, USA, Aug. 19, 2010.
U.S. Appl. No. 12/178,318 Official Action dated May 31, 2011.
CN Patent Application No. 200780026181.3 Official Action dated Apr. 8, 2011.
Wei, L., "Trellis-Coded Modulation With Multidimensional Constellations", IEEE Transactions on Information Theory, vol. IT-33, No. 4, pp. 483-501, Jul. 1987.
U.S. Appl. No. 13/114,049 Official Action dated Sep. 12, 2011.
U.S. Appl. No. 12/405,275 Official Action dated Jul. 29, 2011.
Conway et al., "Sphere Packings, Lattices and Groups", 3rd edition, chapter 4, pp. 94-135, Springer, New York, USA 1998.
Chinese Patent Application # 200780040493.X Official Action dated Jun. 15, 2011.
U.S. Appl. No. 12/037,487 Official Action dated Oct. 3, 2011.
U.S. Appl. No. 12/649,360 Official Action dated Aug. 9, 2011.
U.S. Appl. No. 13/192,504, filed Jul. 28, 2011.
U.S. Appl. No. 13/192,852, filed Aug. 2, 2011.
U.S. Appl. No. 13/231,963, filed Sep. 14, 2011.
U.S. Appl. No. 13/239,408, filed Sep. 22, 2011.
U.S. Appl. No. 13/239,411, filed Sep. 22, 2011.
U.S. Appl. No. 13/214,257, filed Aug. 22, 2011.
U.S. Appl. No. 13/192,501, filed Jul. 28, 2011.
U.S. Appl. No. 13/192,495, filed Jul. 28, 2011.
US 7,161,836, 01/2007, Wan et al. (withdrawn)

\* cited by examiner

REDUCING PEAK CURRENT IN MEMORY SYSTEMS

CROSS-REFERENCE TO RELATED APPLICATIONS

This application claims the benefit of U.S. Provisional Patent Application 61/357,114, filed Jun. 22, 2010, whose disclosure is incorporated herein by reference.

FIELD OF THE INVENTION

The present invention relates generally to memory systems, and particularly to methods and apparatus for efficient control of memory system power consumption.

BACKGROUND OF THE INVENTION

Some data storage systems, such as Solid-State Drives (SSD), store data in a group of non-volatile memory devices such as Flash devices. Several techniques for controlling power consumption in such data storage systems have been proposed in the patent literature. For example, U.S. Patent Application Publication 2007/0159907, whose disclosure is incorporated herein by reference, describes a multi-chip package comprising a plurality of memory chips, each of the memory chips comprising an internal circuit, and a power level detector for detecting a level of a power supply voltage to initialize the internal circuit at power-up. The power level detectors in the respective memory chips are configured to initialize corresponding internal circuits at different points of time.

As another example, U.S. Pat. No. 7,200,062, whose disclosure is incorporated herein by reference, describes a dynamic random access memory device that includes a mode register that is programmed with a delay value. In some embodiments, an offset code is also stored in the memory device. The memory device uses the delay value, which may be added to or multiplied by the offset code, to delay the initiation of a received auto-refresh or self-refresh command. A large number of dynamic random access memory devices in a system may be provided with different delay values and possibly offset codes so that the memory device do not all perform refreshes simultaneously in response to an auto-refresh or self-refresh command issued to all of the memory devices simultaneously.

U.S. Patent Application Publication 2004/0160842, whose disclosure is incorporated herein by reference, describes a semiconductor memory device including a plurality of memory chips. The memory chips are divided into first and second groups that are operated in parallel with each other at the time of a data read. Timings of activating sense amplifiers belonging to the first and second groups are made different from each other. Accordingly, the maximum value of peak current generated when the sense amplifiers are activated at the time of a data read is reduced by half in the semiconductor memory device as a whole.

U.S. Pat. No. 4,768,171, whose disclosure is incorporated herein by reference, describes a semiconductor memory circuit, which includes two or more memory cell arrays each having a plurality of memory cells. A peripheral circuit for achieving selective access operation is provided for each array. At least a timing signal and its delayed timing signals are generated in response to a control signal. Both of the timing signal and the delayed timing signal are used to enable the peripheral circuits at different timing.

SUMMARY OF THE INVENTION

An embodiment of the present invention that is described herein provides a memory device including a plurality of memory cells, a token input interface, a token output interface and control circuitry. The control circuitry is configured to accept a storage command, to condition execution of at least a part of the storage command on a presence of a token pulse on the token input interface, to execute the storage command, including the conditioned part, in the memory cells upon reception of the token pulse on the token input interface, and to reproduce the token pulse on the token output interface upon completion of the execution.

In some embodiments, the control circuitry is configured to condition the execution on the presence of the token pulse only when the execution is expected to exceed a current consumption threshold. In an embodiment, the control circuitry is configured to reproduce the token pulse on the token output interface immediately following the reception of the token pulse on the token input interface when there is no storage command to be executed by the memory device that is expected to exceed the current consumption threshold.

In a disclosed embodiment, the execution of the storage command involves carrying out a sequence of operations by the control circuitry, and the control circuitry is configured to delay one or more of the operations in the sequence, which are expected to exceed the current consumption threshold, until detecting the token pulse on the token input interface. In another embodiment, the control circuitry is configured to receive multiple types of token pulses corresponding to multiple respective current consumption thresholds, and to condition the execution on the presence of a given token pulse of a given type only when the execution is expected to exceed the respective current consumption threshold associated with the given type.

In some embodiments, the control circuitry is configured to receive an additional token pulse while executing the conditioned part of the storage command, and to reproduce the additional token pulse on the token output interface. In an embodiment, the execution of the storage command involves carrying out a sequence of operations by the control circuitry, and the control circuitry is configured to condition two or more of the operations in the sequence on the presence of two or more respective token pulses.

There is additionally provided, in accordance with an embodiment of the present invention, a memory controller that includes a controller token output interface, a controller token input interface and token generation circuitry. The a controller token output interface and the controller token input interface are for connecting to multiple memory devices that are connected in a cascade using respective token input and token output interfaces. The token generation circuitry is configured to revolve at least one token pulse in the cascade by providing the token pulse via the controller token output interface to a first memory device in the cascade, accepting the token pulse via the controller token input interface from a last memory device in the cascade, and re-providing the token pulse to the first memory device, so as to cause each memory device in the cascade to condition execution of storage commands on a presence of the token pulse on the respective token input interface of the memory device.

In some embodiments, the token generation circuitry is configured to generate multiple token pulses and to revolve the multiple token pulses in the cascade. In an embodiment, the token generation circuitry is configured to cause each memory device to condition the execution on the presence of the token pulse only when the execution is expected to exceed a current consumption threshold. In a disclosed embodiment, the token generation circuitry is configured to generate multiple types of the token pulses corresponding to multiple respective current consumption thresholds.

In another embodiment, the token generation circuitry is configured to revolve two or more token pulses in the cascade concurrently. In yet another embodiment, the memory devices are connected to the memory controller in two or more separate cascades, and the token generation circuitry is configured to revolve at least one token pulse in each of the cascades.

There is also provided, in accordance with an embodiment of the present invention, a memory system that includes multiple memory devices and a memory controller. Each of the memory devices includes a respective token input interface and a respective token output interface such that the memory devices are connected in a cascade using the token input and token output interfaces. Each of the memory devices is configured to condition execution of storage commands on a presence of a token pulse on the respective token input interface, to execute the storage commands upon reception of the token pulse on the token input interface, and to reproduce the token pulse on the token output interface upon completion of the execution. The memory controller is configured to revolve the token pulse in the cascade by providing the token pulse to a first memory device in the cascade, accepting the token pulse from a last memory device in the cascade, and re-providing the token pulse to the first memory device.

There is further provided, in accordance with an embodiment of the present invention, a method including accepting a storage command in a memory device that includes a plurality of memory cells. Execution of at least a part of the storage command is conditioned on a presence of a token pulse on a token input interface of the memory device. The storage command, including the conditioned part, is executed in the memory cells upon reception of the token pulse on the token input interface. The token pulse is reproduced on a token output interface of the memory device upon completion of the execution.

The present invention will be more fully understood from the following detailed description of the embodiments thereof, taken together with the drawings in which:

DETAILED DESCRIPTION OF EMBODIMENTS

Overview

Some memory systems (e.g., Solid State Drives—SSDs) comprise a memory controller that stores data in multiple memory devices. In many of these systems there is a specified limit on peak current consumption. Execution of a storage command issued by the memory controller (e.g., read, write or erase) in a memory device involves a sequence of internal operations, some of which draw high current. If such high-current operations occur in different memory devices at the same time, the overall current consumption of the system may exceed the specification.

Embodiments of the present invention provide improved methods and systems for reducing the peak current consumption in memory systems having multiple memory devices. These methods and systems use a token-ring scheme, in which the memory devices pass token pulses to one another. Each token pulse represents a permission to consume a certain current, and the memory devices condition execution of storage commands on the availability of token pulses.

In some embodiments, a memory system comprises a memory controller and multiple memory devices. Each memory device has a token input interface and a token output interface. The memory devices are connected in a cascade using their token input and token output interfaces. The memory controller is connected to the token input interface of the first memory device in the cascade, and to the token output interface of the last memory device in the cascade. The memory controller generates token pulses and revolves them through the cascade by providing the token pulses to the first memory device, accepting the pulses from the last memory device, and then re-providing the pulses to the first memory device in the cascade.

When a certain memory device prepares to execute an internal operation (e.g., part of a storage command) that is expected to consume high current, the memory device checks whether a token pulse is present on its token input interface. If a token pulse is present, the memory device executes the operation, while "holding the token" until the operation is executed. If not, the memory device delays execution of the operation until a token pulse is present. Upon completing the operation, the memory device reproduces the token pulse on its token output interface. If the memory device detects a token pulse on its token input interface, but does not need the token (e.g., because no internal operation is pending or because the pending internal operation is not expected to draw high current), the memory device reproduces the token pulse on its token output interface immediately.

The disclosed token-ring mechanism prevents scenarios in which multiple memory devices carry out high-current operations simultaneously. As a result, the peak power consumption of the memory system is reduced. Moreover, the methods and systems described herein are highly distributed and scalable, since they require only a small number of interface pins in the memory devices and the memory controller. The ring can be extended simply by cascading additional memory devices, and the number of memory devices in the ring in often transparent to the memory controller.

In the disclosed techniques, the decision whether or not to delay execution is made at each memory device, often with a time granularity that is not available to the memory controller. For example, each storage command sent by the memory controller typically triggers a sequence of internal operations in the memory devices. When using the disclosed token-ring mechanism, the memory devices typically condition the execution at the fine granularity of individual internal operations rather than at the coarse granularity of entire storage commands. The memory devices typically use the token-ring mechanism to selectively delay or allow execution of individual internal operations, as opposed to entire storage commands, with fine time resolution that is not available to the memory controller. As such, the disclosed techniques are highly efficient in minimizing any latency that may be added in return for lower peak current.

System Description

Figure 1A:
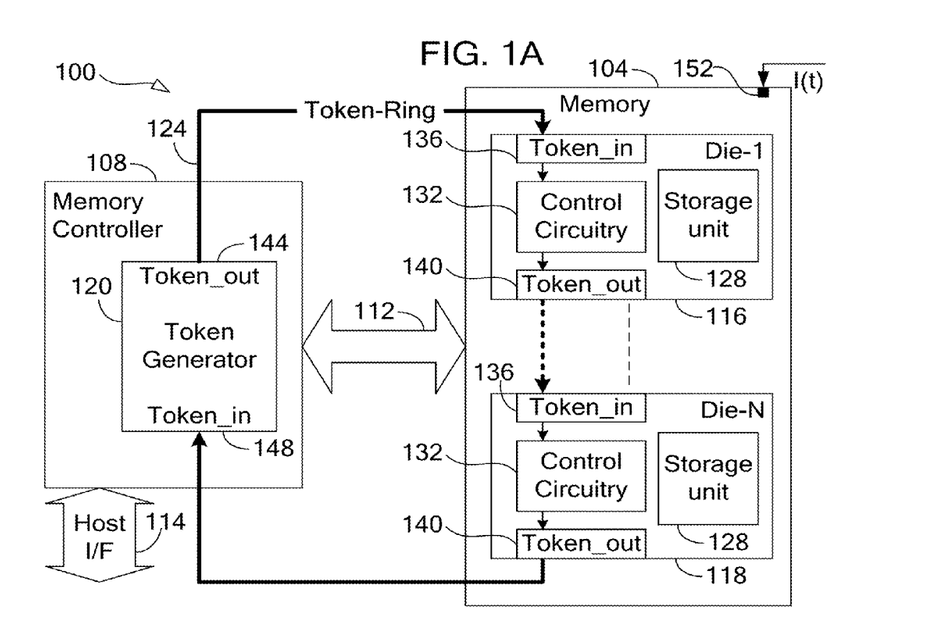
FIGS. 1A and 1B are block diagrams that schematically illustrate memory systems, in accordance with embodiments of the present invention.

FIG. 1A is a block diagram that schematically illustrates a memory system 100, in accordance with an embodiment of the present invention. Memory system 100 may comprise, for example, a Solid State Drive (SSD) or any other suitable type of memory system. System 100 comprises a memory 104, which is connected to a memory controller 108 through a memory interface 112 that serves to transfer data, control and timing signals between controller 108 and memory 104.

The memory controller is typically connected to a host processor (not shown in the figure) through a host interface 114 that serves to transfer data, control and timing signals between the memory controller and the host processor. Memory 104 comprises multiple memory devices. In the present example, memory 104 comprises a Multi-Chip Package (MCP) comprising multiple memory dies denoted Die-1 . . . Die-N. Alternatively, the memory devices may comprise packaged devices that are mounted on a Printed Circuit Board (PCB), or any other suitable type of memory devices.

Each memory device comprises a respective token input interface 136 and a respective token output interface 140. The memory devices are connected in cascade using their token input and token output interfaces. The first and last memory devices in the cascade are denoted 116 and 118, respectively. The token input interface of device 116 and the token output interface of device 118 are connected to memory controller 108, so as to form a token ring 124.

Memory controller 108 sends storage commands to memory 104 for execution in the different memory devices. The storage commands may comprise, for example, read, write and/or erase commands. Executing a given storage command in a given memory device typically involves carrying out a sequence of internal operations in the memory device. For example, a read or write command to a Flash memory device typically involves iterative sequences of internal memory operations. Some of these operations are characterized by high current consumption. For example, bit-line pre-charging operations, which occur at the beginning of program and verification cycles, typically consume high current.

Typically although not necessarily, the current consumption profile during a given storage command comprises several tens of high current peaks whose widths are on the order of several µS, e.g., 10 µS. The time gaps between current peaks may be on the order of several tens of µS, e.g., 30-100 µS. These numerical values are given by way of example, and any other suitable values can also be used.

In some cases, system 100 is not permitted to exceed a certain peak current. If high-current internal operations were to occur simultaneously in multiple memory devices, the maximum peak current specification of system 100 might be exceeded. The token-ring mechanism described below helps to reduce the peak current of system 100. As part of this token ring, memory controller 108 comprises a Token Generator (TG) 120, which provides token pulses to the cascade of memory devices over a token output interface 144, and accepts token pulses from the cascade over a token input interface 148.

Each memory device comprises a storage unit 128, which comprises multiple memory cells. The memory cells may be of any suitable type, such as, for example, Single-Level Cell (SLC) or Multi-Level Cell (MLC) Flash memory cells. Each memory device further comprises Control Circuitry (CC) 132, which is connected to the token input and output interfaces of the device. The memory devices in memory 104 consume supply current denoted I(t) through a power supply port 152.

The token-ring mechanism of system 100 operates as follows: TG 120 generates a token pulse and transfers it through interface 144 and token-ring 124 to interface 136 of device 116. CC 132 of device 116 normally passes the token through by immediately reproducing it on interface 140. Successive memory devices along the ring normally pass the token pulse from one memory device to the next. Finally, memory device 118 transfers the token pulse to interface 148 of TG 120 in the memory controller. The TG passes the token pulse through, thus returning it to memory 104 for another round through ring 124 and so on.

While the token pulse travels through ring 124, CC 132 in each memory device constantly checks the storage commands that are accepted for execution in the memory device from memory controller 108. When an internal operation (which is triggered as part of a storage command) in a given memory device is expected to consume supply current above a predefined current consumption threshold, the CC in the memory device blocks this operation and waits for receiving a token pulse. When the token pulse reaches the given memory device, the CC holds the token, executes the blocked operation, and upon termination of the excess consumption reproduces the token pulse on in the device's token output interface.

The above mechanism ensures that only one high-current memory operation (an operation whose current consumption exceeds the power consumption threshold) is executed at any given moment in system 100. The disclosed token mechanism thus decreases the peak current of system 100, at the possible expense of some delay of high-peak-current operations. In alternative embodiments, TG 120 generates K token pulses that travel through token ring 124, instead of a single token pulse. In these embodiments, only up to K high-current operations can be executed simultaneously. In these embodiments, a memory device that is currently executing a high-current operation (and thus holds a token) may accept another token pulse on its token input interface. In such a case, the memory device typically reproduces the newly-accepted token pulse on its token output interface, and releases the previously-held token upon completing the high-current operation.

In some embodiments, TG 120 uses two or more different types of tokens. Token types may differ from one another, for example, in the memory operations that are permitted to use them, or in the current allocation they permit. In other embodiments, other association criteria between tokens and memory operations can be applied. For example, tokens may be associated with prioritized memory operations. In embodiments wherein the tokens are associated with some memory operation properties or otherwise differ from one another, each token pulse may carry one or more bits for encoding this association or otherwise distinguishing between token pulses of different kinds. CC 132 typically conditions the execution of a memory operation, which corresponds to a certain type of token, on the presence of a token pulse belonging to that type.

The overall token width, as well as its pass-through transition time through the ring, is typically sufficiently short in order to incur low delay penalty. In some embodiments the token and the transition time are considerably narrower than the duration of a typical high-current operation. In an example implementation, the token pulse width is on the order of several clock cycles, e.g., 100 nS. The delay between the token input and token output interfaces in a given memory device (assuming the token pulse is allowed by the memory device to pass through immediately) is on the order of several tens of ns. Generally, however, any other suitable values can be used.

In an embodiment, memory 104 and controller 108 are packaged (e.g., stacked) in the same package. In alternative embodiments, the memory controller and memory devices are packaged separately. TG 120 is typically implemented as part of memory controller 108. However, in some embodiments the TG is realized separately from the memory controller. In the present example, memory 104 comprises a NAND Flash MLC or SLC memory. Alternatively, however, the disclosed techniques can be applied to other memory technologies such as NOR or any other suitable memory technology.

Figure 1B:
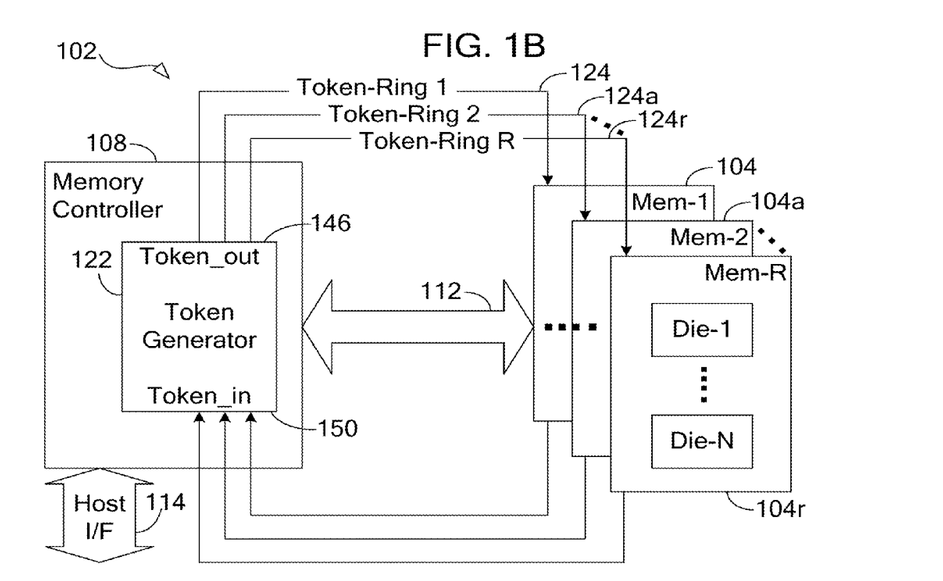

FIG. 1B is a block diagram that schematically illustrates a memory system 102, in accordance with an alternative embodiment of the present invention. Unlike system 100 of FIG. 1A, system 102 uses a multi-ring memory configuration, wherein R memories 104,104a, . . . ,104r form R token rings 124,124a, . . . ,124r. The R rings are connected to a TG 122. TG 122 generates and transfers token pulses to the R rings through an R-port token output interface 146, and receives the token pulses from the R rings through an R-port token input interface 150. This embodiment thus allows controlling the peak current of R memory devices using the same TG.

The system configurations shown in FIGS. 1A and 1B are example configurations, which are chosen purely for the sake of conceptual clarity. In alternative embodiments, any other suitable memory system configurations can also be used. System elements that are not necessary for understanding of the disclosed techniques have been omitted from the figures for the sake of clarity. For example, several memory packages can be chained in a single ring and, additionally or alternatively, the memory devices in a given memory package can pertain to more than one ring. Typically, memory controller 108 comprises a general-purpose processor, which is programmed in software to carry out the functions described herein. The software may be downloaded to the processor in electronic form, over a network, for example, or it may, alternatively or additionally, be provided and/or stored on non-transitory tangible media, such as magnetic, optical, or electronic memory.

Method Description

Figure 2:
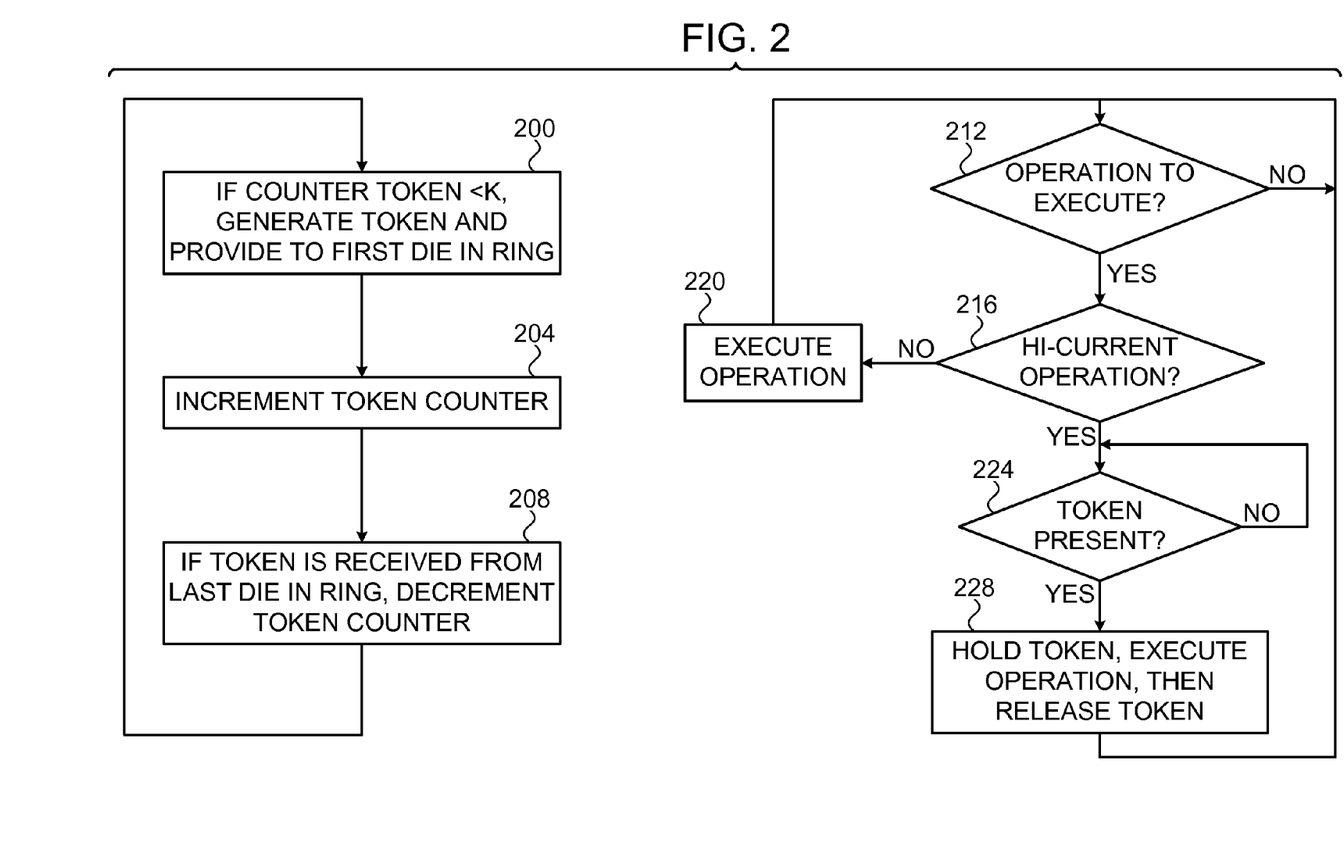
FIG. 2 is a flow chart that schematically illustrates a method for reducing peak current in a Flash memory system, in accordance with an embodiment of the present invention.

FIG. 2 is a flow chart that schematically illustrates a method for reducing peak current in a Flash memory, in accordance with an embodiment of the present invention. The left hand side of the figure shows the operation of TG 120, whereas the right hand side of the figure shows the operation of a given memory device (a given die in the present example) in the token ring.

In the present embodiment, TG 120 maintains a token counter, which counts the number of token pulses that are currently circulating in the ring. The number of token pulses may vary and take any value up to K, depending on system requirements. Assuming the number of currently-circulating token pulses is less than K, TG 120 generates a new token pulse, at a token generation step 200. The TG provides the new token pulse to the first die in the ring. TG 120 then increments the token counter to account for the new token pulse, at a counter incrementing step 204. If TG 120 receives a token pulse from the last die in the ring, it decrements the token counter, at a counter decrementing step 208. The method loops back to step 200 above. The above-described process is carried out continually by TG 120.

Referring now to the right hand side of FIG. 2: CC 132 of the die in question checks whether an internal memory operation is pending for execution, at an operation checking step 212. If not, the method loops back until a memory operation is pending.

If an internal memory operation is pending, CC 132 checks whether this operation is a high-current operation, at a current checking step 216. If not, the die executes the pending operation, at a normal execution step 220, and the method loops back to step 212 above.

If the pending operation is a high-current operation, CC 132 checks whether a token pulse is present on the token input interface, at a token checking step 224. If a token pulse is not present, the die refrains from executing the high-current operation and waits until a token pulse arrives.

When a token pulse is present, CC 132 executes the high-current operation, at a high-current execution step 228. Typically, CC 132 holds the token pulse while executing the high-current operation, and releases the token pulse (reproduces the token pulse on the token output interface) upon execution completion. The method then loops back to step 212 above in order to execute subsequent memory operations.

Note that the above description does not account for a scenario in which the die receives a token pulse while it is in the process of executing a high-current operation (i.e., while it is already holding a token). In this scenario, CC 132 typically allows the latter token pulse to pass through.

The flow chart shown in FIG. 2 is an example flowchart, which was chosen purely for the sake of conceptual clarity. In alternative embodiments, other suitable flows can also be used for realizing the disclosed methods.

Timing Diagrams

Figure 3A:
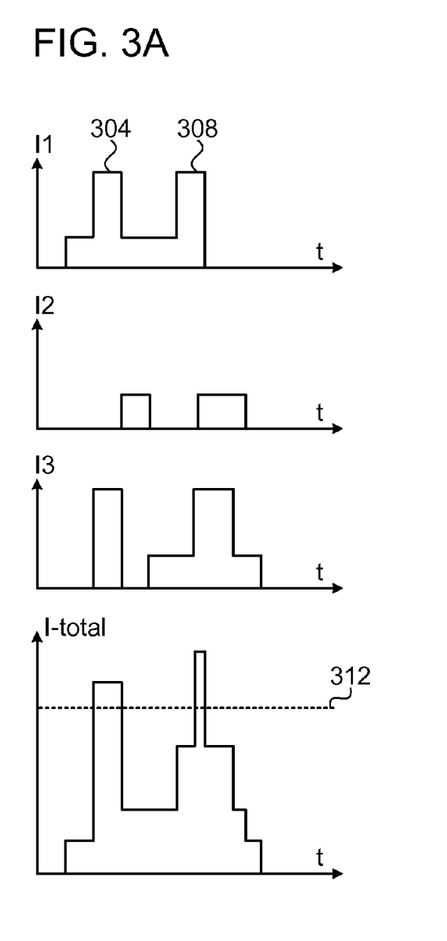
FIGS. 3A and 3B are timing diagrams that illustrate current waveforms, in accordance with an embodiment of the present invention.
Figure 3B:
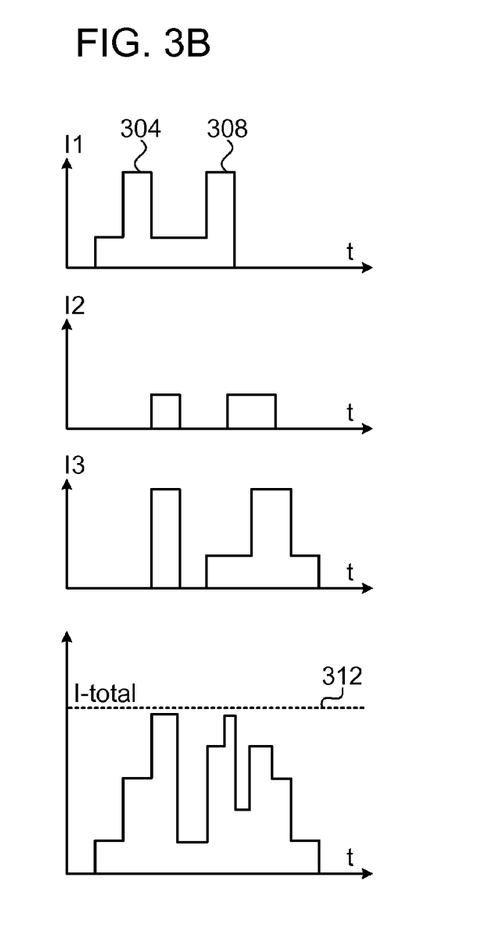

FIGS. 3A and 3B are timing diagrams that illustrate example current consumption waveforms, in accordance with an embodiment of the present invention. The present example refers to a system comprising three Flash dies denoted die-1, die-2 and die-3. FIG. 3A illustrates the current that is consumed without carrying out the disclosed techniques, for reference purposes. FIG. 3B illustrates the current that is consumed while applying the disclosed token ring techniques. As can be seen in the figures, the current waveform of each die comprises a number of power peaks, which are caused by high-peak-current internal operations.

FIG. 3A illustrates example current consumption waveforms of die-1, die-2 and die-3 over time, denoted I1, I2 and I3, respectively. As can be seen in the figure, the current waveforms contain current peaks caused by high-current internal memory operations, such as peaks 304 and 308. The total current consumed by the three dies, i.e., I1+I2+I3, is denoted I-total and is illustrated by the bottom waveform in FIG. 3A. The maximum total current that is permitted for the three dies is marked by a dashed line 312. As can be seen in the figure, the total current occasionally exceeds the maximum permitted current.

FIG. 3B illustrates the I1, I2 and I3 waveforms of die-1, die-2 and die-3, respectively, when using the disclosed token ring technique. I1 and I2 waveforms in FIG. 3B are similar to the corresponding waveforms in FIG. 3A. I3 waveform, which relates to die-3 that follows die-1 and die-2 in the ring, is slightly delayed relative to I3 in FIG. 3A. This delay is a result of die-1 holding a token while executing the operation that causes current peak 304. As a result, a memory operation that was pending in die-3 at the same time (and which caused the total current in FIG. 3A to exceed the maximum permitted value) was delayed. Consequently, the I-total waveform in FIG. 3B, which again comprises the sum of I1, I2 and I3, has lower current peaks relative to the I-total waveform of FIG. 3A. As can be seen in FIG. 3B, the total current consumption when using the disclosed techniques is always below the maximum permitted current.

In the present example, die-2 performed an internal operation that does not draw high current, and therefore did not wait for the token and performed the operation without delay. The other two dies (die-1 and die-3) used the token, which caused the shift of I3 relative to I1. Since die-2 did not use the token, I2 did not move.

It will be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art.

The invention claimed is:

1. A memory device, comprising:
a plurality of memory cells;
a token input interface;
a token output interface; and
control circuitry coupled between the token input interface and the token output interface, wherein the control circuitry is configured to conditionally execute a received storage command dependent on a presence of a token pulse on the token input interface, wherein the token pulse enables execution of at least some storage commands, wherein in response to the presence of the token pulse the control circuitry is configured to execute the storage command in the memory cells, and to reproduce the token pulse on the token output interface upon completion of the execution.

2. The memory device according to claim 1, wherein the control circuitry is configured to conditionally execute on the presence of the token pulse only when the execution is expected to exceed a current consumption threshold.

3. The memory device according to claim 2, wherein the control circuitry is configured to reproduce the token pulse on the token output interface immediately following the reception of the token pulse on the token input interface when there is no storage command to be executed by the memory device that is expected to exceed the current consumption threshold.

4. The memory device according to claim 2, wherein the execution of the storage command involves carrying out a sequence of operations by the control circuitry, and wherein the control circuitry is configured to delay one or more of the operations in the sequence, which are expected to exceed the current consumption threshold, until detecting the token pulse on the token input interface.

5. The memory device according to claim 2, wherein the control circuitry is configured to receive multiple types of token pulses corresponding to multiple respective current consumption thresholds, and to condition the execution on the presence of a given token pulse of a given type only when the execution is expected to exceed the respective current consumption threshold associated with the given type.

6. The memory device according to claim 1, wherein the control circuitry is configured to receive an additional token pulse while executing the conditioned part of the storage command, and to reproduce the additional token pulse on the token output interface.

7. The memory device according to claim 1, wherein the execution of the storage command involves carrying out a sequence of operations by the control circuitry, and wherein the control circuitry is configured to condition two or more of the operations in the sequence on the presence of two or more respective token pulses.

8. A method, comprising:
accepting a storage command in a memory device that includes a plurality of memory cells;
conditionally executing the received storage command dependent on a presence of a token pulse on a token input interface of the memory device, wherein the token pulse enables execution of at least some storage commands;
executing the storage command in response to the presence of the token pulse on the token input interface; and
reproducing the token pulse on a token output interface of the memory device upon completion of the execution.

9. The method according to claim 8, wherein conditionally executing comprises causing the execution to depend on the presence of the token pulse only when the execution is expected to exceed a current consumption threshold.

10. The method according to claim 9, wherein reproducing the token pulse comprises outputting the token pulse on the token output interface immediately following the reception of the token pulse on the token input interface when there is no storage command to be executed by the memory device that is expected to exceed the current consumption threshold.

11. The method according to claim 9, wherein executing the storage command comprises carrying out a sequence of operations in the memory device, and wherein conditioning the execution comprises delaying one or more of the operations in the sequence, which are expected to exceed the current consumption threshold, until detecting the token pulse on the token input interface.

12. The method according to claim 9, wherein conditioning the execution comprises receiving multiple types of token pulses corresponding to multiple respective current consumption thresholds, and conditioning the execution on the presence of a given token pulse of a given type only when the execution is expected to exceed the respective current consumption threshold associated with the given type.

13. The method according to claim 8, and comprising receiving an additional token pulse while executing the conditioned part of the storage command, and reproducing the additional token pulse on the token output interface.

14. The method according to claim 9, wherein executing the storage command comprises carrying out a sequence of operations in the memory device, and wherein conditioning the execution comprises conditioning two or more of the operations in the sequence on the presence of two or more respective token pulses.

* * * * *